US010862087B2

(12) United States Patent
Hartmeyer

(10) Patent No.: US 10,862,087 B2
(45) Date of Patent: Dec. 8, 2020

(54) BATTERY HOUSING

(71) Applicant: Torqeedo GmbH, Gilching (DE)

(72) Inventor: Marc Hartmeyer, Gilching (DE)

(73) Assignee: Torqeedo GmbH, Gilching (DE)

( * ) Notice: Subject to any disclaimer, the term of this patent is extended or adjusted under 35 U.S.C. 154(b) by 441 days.

(21) Appl. No.: 15/439,626

(22) Filed: Feb. 22, 2017

(65) Prior Publication Data

US 2017/0244080 A1 Aug. 24, 2017

(30) Foreign Application Priority Data

Feb. 23, 2016 (EP) ..................................... 16000434

(51) Int. Cl.
| | |
|---|---|
| *H01M 2/00* | (2006.01) |
| *H01M 2/10* | (2006.01) |
| *H01M 2/12* | (2006.01) |
| *H01M 10/48* | (2006.01) |

(52) U.S. Cl.
CPC ....... *H01M 2/1094* (2013.01); *H01M 2/1077* (2013.01); *H01M 2/1223* (2013.01); *H01M 2/1235* (2013.01); *H01M 2/1241* (2013.01); *H01M 2/1276* (2013.01); *H01M 10/48* (2013.01); *H01M 2200/00* (2013.01); *H01M 2200/20* (2013.01); *H01M 2220/20* (2013.01)

(58) Field of Classification Search
CPC ............. H01M 2/1094; H01M 2/1077; H01M 2/1223; H01M 2/1235; H01M 2/1241; H01M 2/1276
See application file for complete search history.

(56) References Cited

U.S. PATENT DOCUMENTS

| | | | | |
|---|---|---|---|---|
| 3,324,816 | A * | 6/1967 | Vogelsang | .............. B63B 43/12 114/68 |
| 3,616,775 | A * | 11/1971 | Holter | ...................... A62C 3/08 114/54 |
| 4,493,664 | A * | 1/1985 | Dale | ..................... B63B 22/003 222/5 |
| 5,681,106 | A * | 10/1997 | Coultas | ................... F21L 15/02 362/190 |
| 5,876,872 | A | 3/1999 | Feezor | |
| 2002/0144638 | A1* | 10/2002 | Mears | ..................... B63B 43/14 114/68 |

(Continued)

FOREIGN PATENT DOCUMENTS

| | | |
|---|---|---|
| CN | 1946607 A | 4/2007 |
| CN | 103633265 A | 3/2014 |

(Continued)

OTHER PUBLICATIONS

Chinese Office Action issued in Chinese counterpart application No. 201710099664.1 dated May 30, 2019, with partial English translation (Twelve (12) pages).

(Continued)

*Primary Examiner* — Stephen P Avila
(74) *Attorney, Agent, or Firm* — Crowell & Moring LLP

(57) ABSTRACT

A housing is disclosed. The housing contains one or more components, where at least one of the components is an electrical component and where the components do not fill the housing completely and a cavity remains within the housing. One or more filling elements are provided in the cavity which fill more than half of the cavity on contact with water.

15 Claims, 1 Drawing Sheet

(56) References Cited

U.S. PATENT DOCUMENTS

2005/0228350 A1* 10/2005 Ranganathan .... A61F 13/47263
604/367
2009/0078183 A1  3/2009 Heinermann
2011/0100289 A1* 5/2011 Birkin ...................... B63C 9/20
116/210
2014/0242429 A1  8/2014 Lee et al.

FOREIGN PATENT DOCUMENTS

| DE | 10 2011 103 986 A1 | 3/2012 |
| DE | 10 2011 077 676 A1 | 12/2012 |
| EP | 2 843 727 A1 | 3/2015 |
| GB | 1 235 693 | 6/1971 |
| JP | 2004-203073 | 7/2004 |
| WO | WO 2011/145978 A3 | 11/2011 |
| WO | WO 2015/150111 A1 | 10/2015 |

OTHER PUBLICATIONS

Chinese Office Action issued in Chinese application No. 201710099664.1 dated Apr. 29, 2020, with partial English translation (Nine (9) pages).

\* cited by examiner

BATTERY HOUSING

This application claims the priority of European Patent Document No. EP 16 000 434.7, filed Feb. 23, 2016, the disclosure of which is expressly incorporated by reference herein.

BACKGROUND AND SUMMARY OF THE INVENTION

The invention relates to a housing which contains one or more components, wherein at least one of the components is an electrical component, wherein the components do not fill the housing completely and a cavity remains within the housing. The invention further relates to a boat which contains such a housing.

Boats with electric drive have batteries on board as energy stores, wherein lithium-ion batteries are preferred energy stores for electric drive systems on boats. Depending on the amount of energy required, the required voltage level of the drive system, and the cell chemistry and cell capacity that are used, the battery is formed as a series connection of individual cells.

When used on a boat, electrical components such as the battery are exposed to increased atmospheric humidity and splashed water. Water which penetrates the battery housing, in combination with the battery cell voltages, leads to electrolysis, which produces highly flammable hydrogen.

Batteries designed for use in boats therefore need to be watertight in accordance with protection class IP67. In case water penetrates the boat, or in case of an accident, no live parts may come into contact with the water. To comply with this protection standard the battery is provided with a watertight battery housing.

However, even watertight housings cannot always fully prevent the penetration of water. The impermeability of the housing is guaranteed only for a certain period and at a certain water pressure, for example for 30 minutes at a one-meter depth of water.

If however a battery goes overboard or a boat sinks, the electrical components are often under water for a longer period and at a greater depth. There is then a danger that water penetrates into the battery housing and leads to an electrolytic reaction and the release of hydrogen. When the battery or boat is recovered, there is a risk of ignition due to sparks or hot surfaces.

The object of the present invention is therefore to reduce the formation and accumulation of hydrogen in a housing that contains electrical components. In particular the formation of hydrogen is to be minimized.

This object is achieved by a housing which contains one or more components, wherein at least one of the components is an electrical component, wherein the components do not fill the housing completely and a cavity remains within the housing, the housing being characterized in that one or more filling elements are provided in the cavity, which fill more than half of the cavity on contact with water.

The invention aims to provide as little space as possible for the water that penetrates into the housing and the gas that may arise in the event of electrolysis. By this means, in particular the amount of gas is to be kept below the critical amount at which the housing explodes in an uncontrolled manner.

According to the invention, the electrical component, for example a battery, is accommodated in a housing. Additional electrical or non-electrical components may also be disposed in the housing. The electrical components and any additional components do not fill the interior of the housing completely, with the result that one or more cavities remain in the housing.

Unless specified to the contrary, the singular noun "cavity" is to be understood hereinafter to refer also to a plurality of cavities, which can be connected with each other or separated from each other.

In the event of an accident in the course of which the housing becomes under water, the cavities can fill with water. Electrical connections on the electrical component, for example the poles of a battery, can then act as electrodes and effect an electrolytic reaction, i.e., a separation of the water into hydrogen and oxygen. The resulting gas spreads around the interior of the housing, as a result of which the pressure in the housing increases, and in the worst case an explosion of the housing occurs.

Therefore according to the invention one or more filling elements are provided in the cavity or cavities. On contact with water, the filling elements fill more than 50% of the cavity, i.e., more than 50% of the volume of the cavity or cavities is occupied by the filling elements. In a preferred variant of the invention, the filling elements fill more than 70%, more than 80% or more than 90% of the cavity on contact with water.

The filling elements fill the cavity at least to the specified extent when they come into contact with water. The volume of the filling bodies can however also fill the cavity to the specified extent in a "dry" state, i.e., before water has entered the cavity. In this case, the volume of the filling bodies is substantially independent of contact with water.

The filling bodies can however also be designed such that their volume does not change until they are in contact with water, i.e., when the housing becomes under water and water penetrates into the cavity or cavities. In every case, more than 50%, more than 70%, more than 80% or more than 90% of the cavity is filled as soon as the filling body or bodies come into contact with water. There thus remains only a correspondingly smaller residual cavity in which water and/or gas can accumulate. In this manner, the amount of water available for possible electrolysis is limited, and the amount of gas that arises is kept within an acceptable limit. Only a small amount of hydrogen can still accumulate in the housing, and as a result the risk of explosion is obviated or at least greatly reduced.

The filling element or elements can be formed as foamed material or foamed bodies, as hollow bodies, or as bodies filled with air or gas. The terms "foamed material" or "foamed bodies" are in particular to be understood as materials with a cellular structure and low density. The foamed material is preferably formed as closed-cell foam. Preferred foamed material or foamed bodies are polyurethane foams (PU foams or PUR foams), in particular waterproof PU foams or two-component PU foams. The foams can also be rendered fireproof by means of an impregnation or coating.

In a further preferred embodiment, the filling bodies consist in full or in part of expanded polypropylene (EPP). EPP is produced from polypropylene, and is a foamed material formed from expanded, predominantly closed-cell foam particles. EPP has a low density of less than 100 kg/m$^3$, and depending on the type less than 50 kg/m$^3$. Furthermore, EPP has low water absorption, is environmentally friendly, and is free of chemical foaming agents.

As an alternative to, or in addition to, foamed materials, it is possible to use hollow bodies, or bodies filled with air or gas, for example in the form of spheres. It is also possible to use granulate, for example plastic granulate, as filling elements.

It is preferable to use filling bodies whose density is less than 500 kg/m$^3$, preferably less than 200 kg/m$^3$, particularly preferably less than 100 kg/m$^3$, and most preferably less than 50 kg/m$^3$. In this manner the total weight of the housing with its components is only minimally increased, so that the buoyancy of the housing, even in the event of water penetration, is retained as far as possible.

The filling bodies also serve to increase the safety of the battery in the event of an accident or crash. In an accident the filling bodies can absorb kinetic energy and prevent or at least reduce the application of energy to the critical battery cells.

In a further embodiment, cables or other components are attached to the filling bodies.

In a further embodiment of the invention, the filling bodies comprise substances that foam on contact with water.

In addition it is advantageous to form the housing such that the volume of the cavity is minimized. The design of the housing is adapted to the components that are accommodated in its interior. In this manner the space available for water and gas is further minimized. Batteries are for example usually formed from cuboid cell blocks. In contrast, the cabling and the necessary electromagnetic components deviate greatly from the cuboid shape. In these areas it is advantageous to build the housing correspondingly smaller.

According to the invention, by means of the provision of filling bodies the volume available for penetrating water is minimized. In addition, measures can be provided to prevent an explosion of the housing following the penetration of water and the formation of hydrogen, in that an aperture allowing the escape of hydrogen is created in the housing.

For this purpose, in a further embodiment the housing has a predetermined breaking point. If the pressure in the interior of the housing exceeds a predetermined pressure the housing breaks open at the predetermined breaking point.

In another embodiment, the housing has an aperture which is closed by a spring-loaded shutoff device. By means of spring pressure, the shutoff device closes the aperture in the housing. If the pressure in the interior of the housing exceeds the pressure applied by the spring, the shutoff device opens the aperture.

In another embodiment, a hydrogen sensor, an evaluation unit and an actuator are provided in the housing. Signal connections exist between the hydrogen sensor and the evaluation unit, and between the evaluation unit and the actuator, i.e., signals can be transmitted between the hydrogen sensor and the evaluation unit, and between the evaluation unit and the actuator. The signal connection can be established by means of fixed wiring or by wireless transmission. The hydrogen sensor detects hydrogen that is present in the housing. If a certain hydrogen concentration is detected in the housing, the actuator is actuated. The actuator then creates an aperture in the housing.

The actuator can be designed as a pyrotechnic element, an electromagnetic element, a thermic element or a chemical element. The actuator creates an aperture in the housing for example by means of an intentionally triggered explosion or chemical reaction. The aperture can also be created in that an electromagnetic element is controlled to open or create an aperture by electromagnetic interaction.

Thermic elements that can be used for this purpose include for example:

a heating wire that melts through the housing or a portion of the housing and thereby forms an aperture in the housing; and a capsule or cartridge provided with a heating resistor, which melts through the housing or a portion of the housing after activation.

Possible chemical elements for creating an aperture in the housing can be:

one or more chemical substances that are electronically triggered to create heat, which melt through the housing or a portion of the housing; and substances that are triggered or activated such that they break down the material of the housing or a portion thereof.

In a further variant, at least a portion of the housing is formed from a non-waterproof material. The term "non-waterproof" is to be understood here to mean that when a given specification, for example corresponding to the IP67 protection class, is exceeded, the material breaks, disintegrates or otherwise fails, and water can penetrate into the housing. A portion of the housing can also be attached to the remainder of the housing by means of an adhesive, wherein the adhesive loses its adhesive power if the specification (for example IP67) is exceeded during operation.

The housing according to the invention serves in particular to accommodate a battery or an accumulator, in particular an accumulator containing lithium ions. The electrical components that are disposed in the housing can however also be for example an electric motor or an electric or electronic control or regulation unit. Other maritime components, i.e., electric or electronic components that are used on a boat, such as distributor boxes, generators, motors or chargers, can be accommodated in one or more housings according to the invention.

The invention is advantageously used on boats or other water vessels, since in these cases the danger posed by water penetration into the housing is particularly high.

The invention and further details of the invention are explained below using examples depicted in the schematic drawings.

DETAILED DESCRIPTION OF THE DRAWINGS

Figure 1:
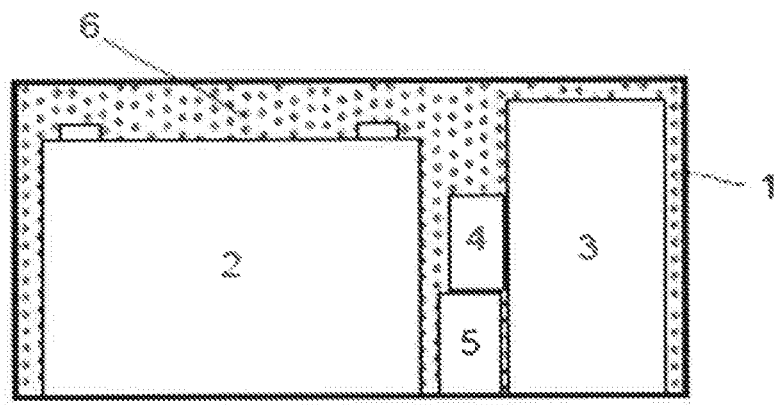
FIG. 1 shows a first embodiment of the housing according to the invention.

FIG. 1 shows a housing 1 which serves to accommodate a battery 2 and further electrical or electronic components 3, 4, 5 on board a boat. The housing 1 has a cuboid design. The battery 2 and the components 3, 4, 5 do not fill the entire interior of the housing 1. In some places there is a cavity between the individual components, between the wall of the housing and the components 3, 4, 5, and/or between the wall of the housing and the battery 2. The cavity is filled with small filling bodies 6. Foam beads or polystyrene beads are for example used as filling bodies 6.

Figure 2:
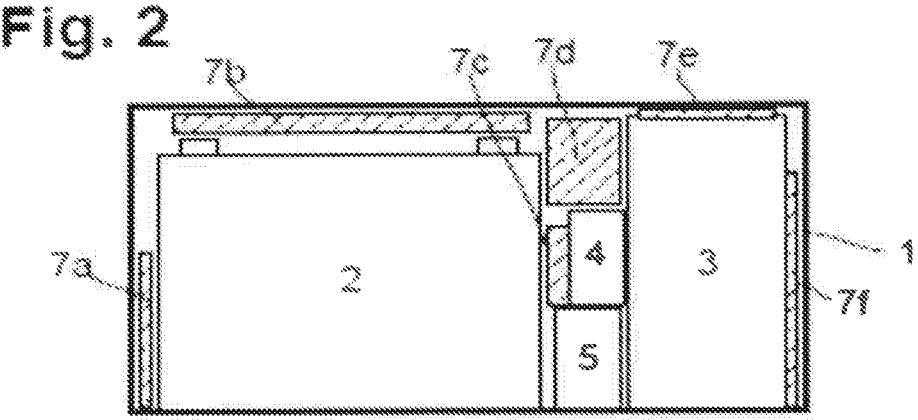
FIG. 2 shows a second embodiment of the invention in the dry state.

FIG. 2 shows a further embodiment of the invention. In all Figures, elements which are identical are designated with the same reference numbers.

In the embodiment shown in FIG. 2, filling bodies 7a, 7b, 7c, 7d, 7e, 7f are introduced in the cavities between the components 3, 4, 5, the battery 2 and the walls of the housing, not filling the cavities completely in a dry state. The filling bodies 7a, 7b, 7c, 7d, 7e, 7f consist in full or in part of foamed materials which foam up and increase their volume on contact with water.

Figure 3:
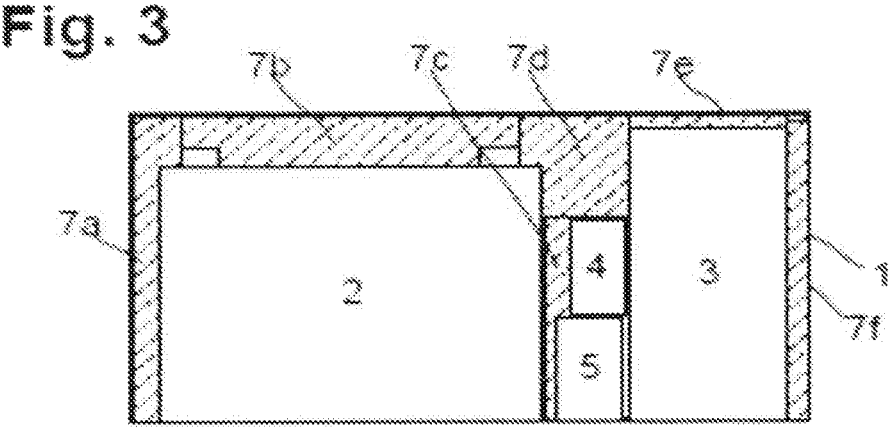
FIG. 3 shows the second embodiment after contact with water.

FIG. 3 shows the same housing after its interior has been penetrated by water and the filling bodies 7a, 7b, 7c, 7d, 7e, 7f have become wet. Filling bodies 7a, 7b, 7c, 7d, 7e, 7f have foamed up, and have increased their volume to the extent that almost all cavities in the housing 1 have been filled.

If for example the housing 1 with the battery 2 and the components 3, 4, 5 falls into water, the filling bodies 7a, 7b, 7c, 7d, 7e, 7f foam up and the interior of the housing 1 is almost completely filled. There is little remaining space for water to penetrate into the housing 1, and/or water that is already in the housing 1 is forced out of the housing 1.

The filling bodies 7a, 7b, 7c, 7d, 7e, 7f have a low density of less than 100 kg/m$^3$. The specific total weight of the housing 1 with the battery 2, the components 3, 4, 5 and the filling bodies 7a, 7b, 7c, 7d, 7e, 7f is thereby lower than that of the water, with the result that the housing 1 floats. The housing 1 according to the invention can therefore be used to particular advantage on a boat.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus, comprising:
   a housing;
   one or more components disposed in the housing, wherein at least one of the one or more components is an electrical component that is a battery or an accumulator containing lithium ion, and wherein the one or more components do not fill the housing completely and a cavity remains within the housing; and
   one or more filling elements disposed entirely within the cavity, the filling elements having volumes that expand entirely within the cavity to fill more than half of the cavity on contact of the one or more filling elements with water.

2. The apparatus according to claim 1, wherein the one or more filling elements are foamed bodies, hollow bodies, or bodies filled with air or gas.

3. The apparatus according to claim 1, wherein the one or more filling elements are substances that increase in volume on contact with water.

4. The apparatus according to claim 1, wherein the one or more filling elements fill more than 70% of the cavity on contact with water.

5. The apparatus according to claim 1, wherein a density of the one or more filling elements is less than 500 kg/m3.

6. The apparatus according to claim 1, wherein the housing is formed such that a volume of the cavity is minimized.

7. The apparatus according to claim 1, wherein the electrical component is an electric motor or an electric control unit or an electric regulation unit or an electronic control unit or an electronic regulation unit.

8. The apparatus according to claim 1, wherein the housing has a predetermined breaking point.

9. The apparatus according to claim 1, wherein the housing has an aperture which is closed by a spring-loaded shutoff device.

10. The apparatus according to claim 1, wherein a hydrogen sensor, an evaluation unit and an actuator are disposed in the housing, wherein signal connections are provided between the hydrogen sensor and the evaluation unit, and between the evaluation unit and the actuator, and wherein the actuator creates an aperture in the housing if a hydrogen concentration exceeding a minimal value is detected by the hydrogen sensor.

11. The apparatus according to claim 10, wherein the actuator is a pyrotechnic element, an electromagnetic element, a thermic element, or a chemical element.

12. The apparatus according to claim 1, wherein at least a portion of the housing is formed from a non-waterproof material.

13. The apparatus according to claim 1, wherein the one or more filling elements consist at least in part of more than 70% by volume of expanded polypropylene or consist of 100% of expanded polypropylene.

14. A boat containing an apparatus according to claim 1.

15. A method for filling a cavity in a housing within which one or more components are disposed, wherein at least one of the one or more components is an electrical component that is a battery or an accumulator containing lithium ion, wherein the one or more components do not fill the housing completely such that the cavity is formed in the housing, and wherein one or more filling elements are disposed in the cavity, the method comprising the steps of:
   contacting the one or more filling elements with water such that a volume of the one or more filling elements is increased so as to thereby fill more than half of the cavity; and
   retaining the filing elements remain entirely within the cavity.

* * * * *